Oct. 5, 1965

A. B. HAMMITT 3,209,869

PARTITION ASSEMBLY

Filed Sept. 12, 1961

INVENTOR.
ANDREW B. HAMMITT.
BY Albert Sperry
ATTORNEY

Oct. 5, 1965

A. B. HAMMITT 3,209,869

PARTITION ASSEMBLY

Filed Sept. 12, 1961

INVENTOR.
ANDREW B. HAMMITT.
BY Albert Sperry
ATTORNEY

United States Patent Office 3,209,869
Patented Oct. 5, 1965

3,209,869
PARTITION ASSEMBLY
Andrew B. Hammitt, 909 W. State St., Trenton, N.J.
Filed Sept. 12, 1961, Ser. No. 137,562
3 Claims. (Cl. 189—36)

This invention relates to partition assemblies and is directed particularly to novel and improved constructions which require no bolts, screws, rivets or other fastening means for erections, except those which may be employed in anchoring the posts of the partition in place. Nevertheless, the assembly is characterized by unusual strength and rigidity while permitting great variation in its form and usage.

Many types of partition assemblies have been produced heretofore but they have in general been relatively expensive to produce and have required numerous bolts, screws or other fastening means for securing the various elements of the assembly together. As a result, the time and labor involved in erecting prior partitions has been considerable. Moreover, "rail type" partitions, wherein the elements do not extend all the way to the floor or ceiling for support, frequently lack the strength and rigidity desired in many partition assemblies.

In accordance with the present invention, a new type of partition assembly is provided wherein the elements are so formed as to permit interlocking of the elements in a manner which renders it unnecessary to employ bolts or the like in assembling the elements and erecting the partition. However, the elements when thus interlocked so reinforce and mutually support each other as to create a structure which possesses unusual strength and rigidity.

All of the elements employed in assemblies embodying the present invention may be easily fabricated in a factory in standard or usual sizes and lengths and may be varied in their arrangement to produce numerous alternative partition designs to meet widely varying conditions and architectural requirements.

Accordingly, the principal object of the present invention is to provide a novel type of partition assembly adapted to be erected without the use of bolts or other usual fastening means.

Another object of the invention is to reduce the cost and time required to erect partition assemblies.

A further object of the invention is to provide a partition assembly which is characterized by unusual strength and rigidity.

A specific object of the invention is to provide complementary elements for use in erecting partitions, which elements are formed with interlocking means, engageable to facilitate erection and cooperate in strengthening and reinforcing each other.

These and other objects and features of the present invention will appear from the following description thereof wherein reference is made to the figures of the accompanying drawings.

Figure 1:
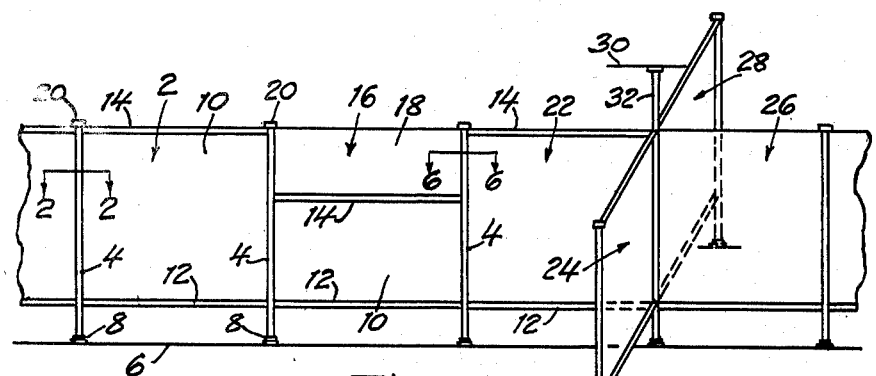
FIG. 1 is a diagrammatic illustration of a typical partition assembly embodying the present invention showing various alternative arrangements of elements which may be employed therein.

In that form of the invention shown in FIG. 1, the partition assembly is of the rail type and embodies a plurality of sections. In the section 2, the partition embodies vertically extending posts 4 supported on the floor 6 by floor anchor members 8. The body of the section includes a panel or sheet of wall-forming material 10 and has a lower rail 12 and an upper rail 14 which extend horizontally along the upper and lower edges of the panel 10 from one of the posts 4 to another.

The section 16 of the partition shown in FIG. 1 embodies a lower portion including a panel of wall-forming material 10 with horizontal rails 12 and 14 extending along the lower and upper edges of the panel. However, a glass window or pane 18 is located in the upper portion of the section 16 and extends from the upper rail 14 above the panel 10 to a level substantially even with the tops of the posts 4. If desirable, the tops of the posts 4 may be provided with caps 20 but these are not necessary and serve only as trim.

The section 22 of the partition of FIG. 1 is similar to the section 2 but cooperates with other sections indicated at 24, 26 and 28. Thus, a four-way intersection which may include various types of sections may be employed for dividing an area into separate offices or other spaces as required in any particular installation.

As shown in FIG. 1, the vertical posts 4 may terminate short of the ceiling 30 of the space wherein the partition is erected so that the upper ends of the posts are in alignment with the top rails or the upper edges of the glass panels of the section. Nevertheless, if desired, one or more of the vertical posts may be extended to the ceiling 30 as indicated by the portion 32 of the post at the four-way intersection of the panels in FIG. 1.

The vertical posts 4, as shown in FIGS. 2 to 6, are generally H-shaped in cross-section and have parallel face portions 34 which are joined by an intermediate web 36. The opposite free edges of each of the face portions of the post are provided with inwardly projecting locking ribs 38 which extend lengthwise of the column. The locking ribs are preferably tapered in cross-section so as to present a flat exposed edge 40 and an inclined inner surface 42 terminating in a locking face 44 which extends substantially at right angles to the inner surface of the face portions 34 of the post.

Posts of this type may be readily formed of extruded metal, such as aluminum or one of its alloys, and may be cut into standard lengths for use in conventional or specified partition assemblies. However, such extrusions are capable of being readily cut with a saw in the event some special dimensions are required to meet unusual conditions. Therefore, adaptations or variations in the length of the posts can be made on the job without employing any special equipment or specially skilled workmen.

The lower and upper rails 12 and 14 employed in erecting the partitions are preferably U-shaped in cross-section so as to have a base or exposed surface portion 46 and two opposite legs or side portions 48. The free edges of the side portions of the rails are preferably provided with inwardly projecting ribs 50 which are tapered in cross-section to present an exposed edge 52 and an inclined inner surface 54. The width of the surface portions 46 of the rails is preferably substantially equal to the distance between the parallel face portions 34 of the post 4 so that the outer surfaces of the side portions 48 of the rails will be substantially flush with the face portions 34 of the posts when the rails and posts are assembled.

The rails also may be formed of extruded aluminum or other suitable or preferred material and may be cut to standard or specified lengths at the factory so that no cutting or modification of the rails on the job will ordinarily be necessary.

Figure 4:
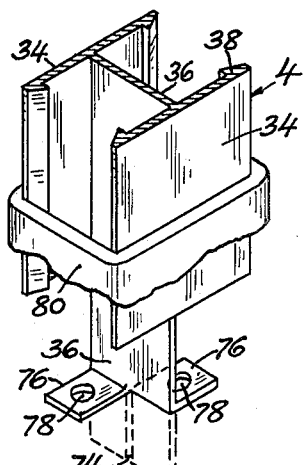
FIG. 4 is a perspective showing an alternative construction for securing the partition posts in place.
Figure 3:
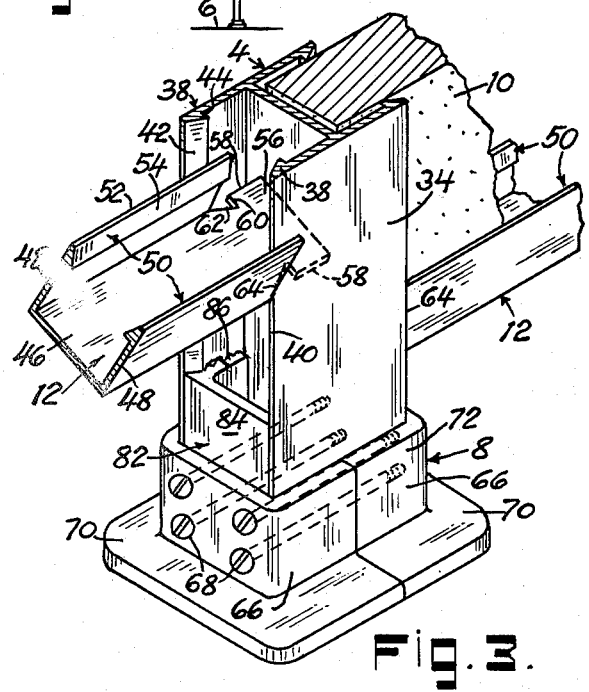
FIG. 3 is a perspective illustrating one form of floor anchor and elements adjacent thereto with parts in section.
Figure 2:
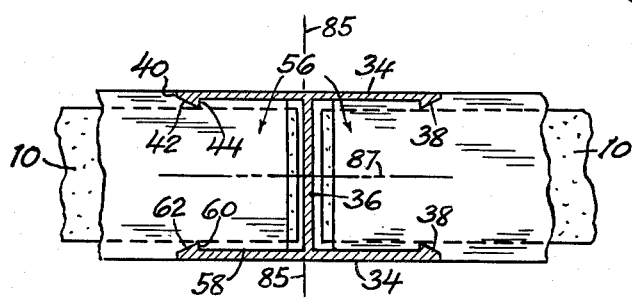
FIG. 2 is a horizontal sectional view of a portion of the construction shown in FIG. 1 taken on the line 2—2 thereof.

The ends of the rails 12 and 14 or any other horizontally extending elements of the assembly are formed to have an interlocking engagement with the posts 4 to assure a positive connection between the rails and posts. For this purpose, the rails are preferably cut, stamped or otherwise formed at each end as shown in FIGS. 2, 3 and 4. Thus, the side portions 48 of the rail may be removed for a short distance adjacent the opposite ends of the rail so as to provide extensions 56 on the ends of the rail which project beyond the side portions 48. These extensions are of a width slightly less than the distance between the inner surfaces of the face portions 34 of the posts 4 but greater in width than the distance between the inner extremities of the locking ribs 38 on the post. The extensions 56 are notched or otherwise formed to interlock with the inwardly projecting locking ribs 38 on the free edges of the face portions 34 of the vertical posts 4.

As shown in FIGS. 2, 3 and 4, each of the opposite edges 58 of the extension 56 on the end of the rail is provided with a notch presenting a side 60 which extends inwardly at right angles to the longitudinal edge 58 of the extension and an inclined side 62 which extends from the base of the notch to a point in alignment with the right angularly extending end 64 of the adjacent side portion 48 of the rail. The right angular side 60 of the notch and the inclined side 62 thereof are shaped to correspond generally to the surfaces 44 and 42 respectively of the locking ribs 38 on the posts 4.

The construction thus provided permits quick and easy assembly of the elements to erect a portion without the use of any fastening means except in the floor anchor for the posts. A strong rigid interlocking structure may be produced nevertheless. For this purpose, the lower ends of the posts 4 may be secured to the floor 6 by any suitable means. As shown in FIG. 3, a floor anchor 8 may be used and may be formed of two similar sections 66 adapted to be secured together by screws 68 or the like. Each half of the floor anchor is provided with a base portion 70 adapted to be secured to the floor by bolts or screws and has a sleeve portion 72 which projects upwardly from the base to receive and fit tightly about the lower end of the vertical post 4. The sections of the floor anchors are, of course, positioned in the properly spaced relation and locations to receive the vertical posts 4 and after insertion of the lower end of the post therein the sections are tightened about the lower end of the post by tightening the screws 68 to grip the post firmly and hold it in an erect position.

In the alternative construction shown in FIG. 4, the lower end of the post is formed at the factory with a foot adapted to be secured to the floor. Thus, the face portions 34 of the post at one end thereof are removed and the projecting web 36 is split longitudinally along the median line 74 as shown in dotted lines in FIGS. 4. The two halves of the split web are then bent in opposite directions from the plane of the web 36 to form right angularly extending feet 76 adapted to rest upon the floor in erecting the post. Each foot is provided with an opening 78 through which a screw or other fastening means may be passed for securing the post in place. A cover sleeve 80 may then be slipped over or fitted about the post in position to rest on the floor and conceal the feet and fastening means and extend upward about the lower end of the post. The sleeve 80 may, of course, be formed in two sections to be secured about the lower end of the post if desired.

When using either the floor anchor of FIG. 3 or the foot construction of FIG. 4, the sleeve which surrounds the lower end of the post may extend upward so as to form a shoulder or support upon which the horizontal rails 12 of the partition may rest.

In erecting the posts 4, they are positioned so that the open or channelled sides of the posts face toward each other and the face portions 34 thereof are positioned to be exposed on the opposite faces of the partition. In the event the sleeves surrounding the lower ends of the posts 4 are relatively short and terminate below the rails 12, closure pieces or spacers 82 may be pressed or slipped lengthwise into the channels of the posts to close the channels. As shown in FIG. 3, such a closure piece or spacer may be U-shaped in cross-section and present a smooth exposed finish surface 84 which is positioned flush with the exposed edges 40 of the locking ribs 38 at the opposite edges of the channel in the post 4. The side portions of the closure piece are then formed with longitudinally extending grooves shaped to fit closely against the surfaces of the locking ribs 38 of the post to hold the exposed surface 84 in position to close the channel in the post 4.

The spacer 82, when used, is moved downward in the channel of the post 4 until its lower end rests upon the upper edge of the sleeve 72 of the floor anchor 8. The length of the spacer 82 is chosen so that the lower horizontal rail 12 of the partition may rest upon the upper end of the spacer and be properly spaced from the floor 6 on which the partition is erected.

The lower rail 12 is designed to be inserted between the adjacent posts 4 of the partition and arranged with its base portion 46 facing downward and the side portions 48 extending upward to receive the lower edge of the sheet 10 of wall-forming material. In order to insert the rail into place, it may be turned sideways as shown in FIG. 3 whereby the extensions 56 on the ends of the rail are positioned at an angle between the parallel face portions 34 of the post. Thereafter the rail is turned so that the channel between the side portions 48 face upwardly. In thus turning the rail, the notches in the opposite edges 58 of extension 56 will be caused to engage and fit the locking ribs 38 at the edges of the face portions 34 of the post 4. Moreover, in thus turning the rail 12, the inclined edges 62 of the notches are caused to engage the inclined surfaces 42 of the locking ribs 38 so as to act as wedges in causing the extensions 56 to grip and bind against the locking ribs 38. They thus provide a positive and rigid connection between the rails and posts 4. Furthermore, upon turning the rail 12 to its proper interlocked position with the post 4, the right angularly extending ends 64 of the side portions 48 of the rail are brought into positive right angular engagement with the edge 40 of the locking ribs 38 at the vertical edges of the face portions 34 of the posts 4 so as to engage directly against the posts.

After rail 12 has been locked into the posts with the extensions 56 seated against the upper ends of the spacers 82, it will be properly located to receive the panel 10 of wall-forming or sheet material. The sheet 10 then may be inserted between the posts 4 and moved downward into the upwardly facing channel of the rail 12. The sheet material 10 is of such thickness that its lower edge is gripped by the ribs 50 on the side portions 48 of the rail 12 whereas the vertical edges of the sheet 10 are gripped by the locking ribs 38 on the free edges of the face portions 34 of the posts 4. The panel 10 is thus easily but securely mounted in place in the partition and its edges are embraced and preferably gripped about the entire perimeter of the panel.

Figure 5:
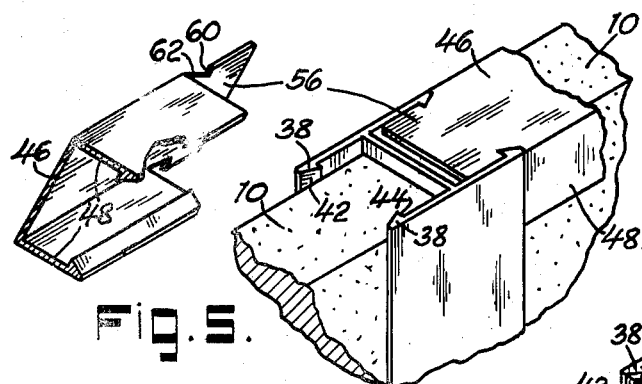
FIG. 5 illustrates the manner in which top rails of the assembly are joined to a post in erecting the partition of FIG. 1.

Following the insertion of the panels 10 between the posts 4, the upper rail 14 is placed in position in the manner shown in FIG. 5. Thus, the channel in the rail 14 is faced downward so that its side portions 48 embrace the upper edge of the panel 10 and the base or surface portion 46 of the rail faces upwardly. In placing the upper rail 14 between the posts 4, the extensions 56 on the upper rail 14 are interlocked with the locking ribs 38 on the posts 4 to develop the wedging and gripping action of the inclined surfaces 42 and 62 on the locking ribs and extensions respectively. Moreover, the right angularly extending sides 60 of the notches in the extensions 56 on the rail 14 are brought into locking engagement with the right angularly extending locking faces 44 of the locking ribs 38 on the posts 4 to assure a positive and rigid connection between the rail and the posts.

The assembly of the two-way partition of rails and panels is assisted by the minor axis 85 of the cantilever post 4. This lesser section modulus, in inches cubed, when assembled with rails and panels is unusually reinforced resulting in a partition of much greater strength, rigidity and stiffness. The interlocking device of the assembled upper and lower rails 12 and 14 respectively and the rectangular panels with the cantilever post produces upper and lower chords of a truss reinforcing the post in its minor axis. This truss-like action stems from the fact that the rectangular installed panels 10 are closely surrounded and gripped about their perimeter by the rails and cantilever posts whereas the latter are positively interlocked at the corners of the panels to establish "effective pin joints." Thus, the rails and posts with panels combine to become tension or compression members resisting deformation of the assembly. Also adding either three-way or four-way partition intersections to the face portions 34 normal to the major axis 87 of the post 4 the partition assembly is greatly stiffened and strengthened.

The construction provided further serves to assure positive gripping of the sheet material by the posts and rails despite substantial variations in the thickness of the sheet material employed. Such variations in thickness result from differences in thickness of the sheet as produced and changes in thickness after manufacture for various reasons such as the absorption or loss of moisture during storage of the sheet material or even after it has been assembled with other elements in a partition. It is for this reason that prior partition assemblies frequently are relatively weak, loose and sometimes rattle even though the posts and rails are tightly bolted together.

In accordance with the present invention, these objections are eliminated by reason of the inwardly projecting locking ribs 38 on the posts 4 and the inwardly projecting ribs 50 on the side portions of the rails. These ribs project inwardly toward the channels in the posts and rails and present inclined surfaces 42 and 50 respectively. Therefore, the entrance to each channel is tapered to permit insertion of sheets of material which differ considerably in thickness and the side walls of the channels are capable of spreading sufficiently to permit the entry of the sheet. In this way, the ribs are caused to press firmly against the sheets of material and to assure strong, sprung engagement therewith even though the sheets differ or change in thickness after erection of the partition. In this way, the posts and rails cooperate with the sheet material employed to utilize the strength of the sheet material in developing the maximum strength and rigidity in each section of the partition assembly.

Figure 6:
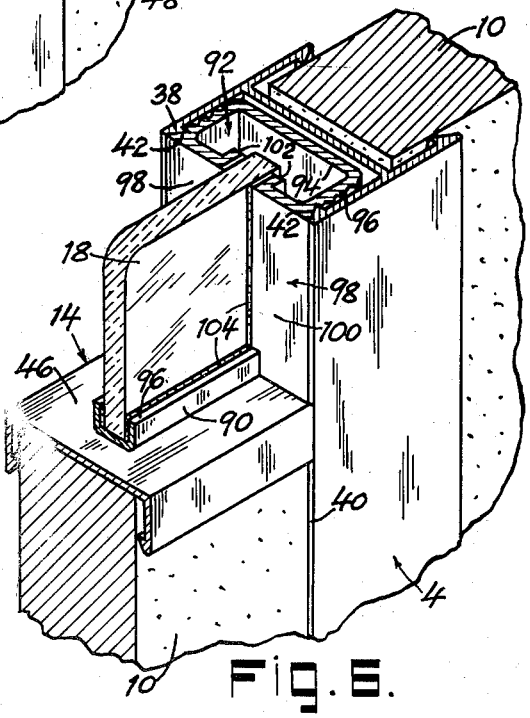
FIG. 6 is a perspective illustrating elements as arranged on the line 6—6 of FIG. 1 with parts shown in section.

As illustrated in FIG. 6 of the drawings, constructions of the present invention are capable of use in erecting partition assemblies of the type shown in section 16 of FIG. 1 wherein the lower portion of the partition embodies a panel 10 of wall-forming material whereas the upper portion of the partition consists of a pane of glass 18. For this purpose, rail 14 which extends along the upper edge of the panel 10 may be formed with a glass-receiving channel 90 which may be formed integral with the rail 14 by employing a special die for extruding a strip of such cross-section. However, if preferred, the glass-receiving channel may be secured to the face portion 34 of the rail by fasteners, spot welding, or other operations performed at the factory so that no fasteners or additional operations are required at the site when erecting partitions embodying a glass pane.

The post 4 is also provided with a glass-receiving channel member such as that indicated at 92. This member is adapted to be inserted lengthwise into the channel of the post which faces toward the glass pane and has a base 94 with sides 96 terminating in inwardly extending spacer portions 98. The outer edges of the spacer portions 98 are bevelled to engage the inclined surfaces 42 of the locking ribs 38 on the post 4 and locate the exposed faces 100 of the spacer portions flush with the edges 40 of the locking ribs 38. The inner edges 102 of the spacer portions 98 receive the vertical edge of the glass pane 18. Both the sides of the glass-receiving channel 90 and the edges 102 of the spacer portions 98 are spaced apart sufficiently to receive a gasket 104 for cushioning and sealing the edges of the glass pane when it is inserted in place.

Figure 7:
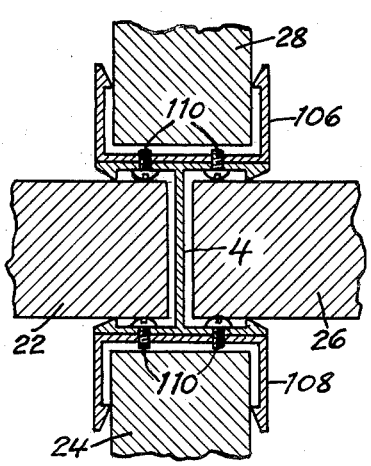
FIG. 7 is a horizontal sectional view through a four-way intersection of panels which may be used in accordance with the present invention.

In order to permit the intersection of a plurality of partition sections at any post in the assembly as represented by the intersection of sections 22, 24, 26 and 28 in FIG. 1, the post 4 may be modified as shown in the four-way intersection of FIG. 7. For this purpose, the usual post 4 may be used and separately formed channel members 106 and 108 can be secured to the oppositely facing surfaces 34 of the post by means of screws, rivets or the like as shown at 110. The production of such a modified post can be effected very readily in the factory to produce either a three-way or a four-way post as required in any installation. At the same time, only two metal extruding dies will be required; one for producing the usual post 4, and the other for producing the channel members 106 and 108. However, if preferred, special forming dies may be employed to produce integral posts for three-way and four-way intersections.

In any event, whether the post is fabricated as shown in FIG. 7, or is extruded as an integral construction, the rails 12 and 14 can be assembled with the post as previously described without employing any bolts or other fastening means when erecting the partition sections.

Further, as shown in FIG. 1, the post of FIG. 7 or any of the other posts in the partition assembly may be extended above the upper or top rail of the partition as indicated at 32. The upper end of the post may then be fixedly secured to the ceiling by means of a floor anchor such as that shown in FIG. 3 or by any other suitable means and the channels in the posts may be closed by closure elements as shown at 82 in FIG. 3.

Figure 8:
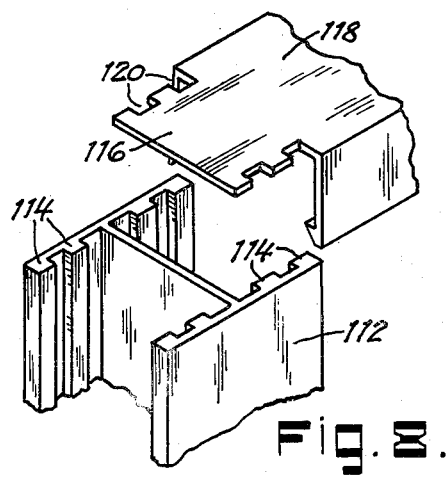
FIG. 8 is a perspective of an alternative form of rail and post embodying the present invention.

The posts 4 and rails 12 and 14 are preferably formed with locking ribs 38 and notches in the extensions 58 thereof that present cooperating inclined surfaces which develop a wedging action when the rail and its extension are turned to horizontal positions in assembling the elements. However, other shapes and forms of ribs, notches or interlocking means may be employed as shown in FIG. 8 wherein the post 112 is provided with multiple locking ribs 114 and the extension 116 on the rail 118 has multiple notches 120 in the edges thereof. Moreover, as shown in FIG. 8, the cooperating ribs and interlocking notches employed are rectangular in shape instead of being tapered.

Figure 9:
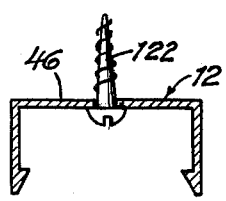
FIG. 9 illustrates a further alternative element embodying the present invention.

Further as shown in FIG. 9, the rails 12 and 14 or the channel members 106 and 108 of the post in FIG. 7 may be used in those locations wherein the partition extends to the floor or ceiling or abuts a wall. In such locations, the base 46 of the rail may be drilled at the plant to provide suitably spaced openings for receiving screws or other fastening means 122 for securing the rail in place.

Figure 10:
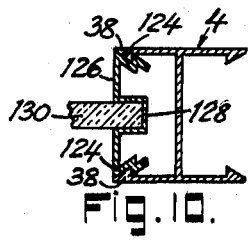
FIG. 10 is a sectional view through an alternative form of sheet-receiving element.

As shown in FIG. 10, a simplified form of panel-receiving means may be employed in the assembly of FIG. 6 or elsewhere to receive and hold the edges of a pane of glass or a sheet of plywood, wallboard or other material. For this purpose, the panel-receiving means is formed at its opposite edges with longitudinally extending grooves 124 shaped to engage the locking ribs 38 on the posts 4. The face 126 of the panel-receiving means may then be formed with a channel 128 of suitable width to receive the edge of a panel 130. Panel-receiving means of this type may be slipped lengthwise of the post along the locking ribs or pressed inward into the channel in the post as desired.

It will be apparent from the foregoing description that the present invention permits great variation in the design and construction of partitions while employing a limited number of types and formations of the elements. At the same time, the elements may be easily assembled in erecting a partition without using any fastening means whatever except those which may be employed in securing an anchor or other element to a floor, ceiling or existing wall. Nevertheless, the partitions produced possess unusual strength and rigidity assuring the requisite durability for any and all installations.

As illustrated in the drawings and described above, the various elements employed in the combination are capable of numerous variations in shape or cross-section. However, in every instance, the elements may be produced in a factory in a form ready for use without modification or change on the site of erection.

It should, therefore, be understood that the particular form, shape and size of the elements employed and the type of wall-forming sheets, floor anchors and other members used in the assembly and erection of partitions, as shown in the drawings and described above are intended to be illustrative only and are not intended to limit the scope of the invention.

I claim:

1. A rail-and-post structure for a partition assembly of the type wherein a sheet of rigid material is engaged along vertical and horizontal edges thereof, comprising: a channeled post including spaced, parallel face portions and an intermediate web extending between and joining the same, said face portions being resiliently, yieldably spreadable and including inwardly projecting, longitudinal locking ribs having inclined surfaces diverging in a direction away from the web, each of said ribs having a locking face in confronting, spaced relation to said web; and a channeled rail including side portions, and a base portion extending between and joining the same, said side portions being resiliently, yieldably spreadable and including inwardly projecting, longitudinal locking ribs having inclined surfaces diverging in a direction away from the base portion, said base portion including an extension projecting into the space between the face portions of the post and formed with side notches mating with the ribs of the post in engagement with said locking faces thereof interlocking the rail with the post, corresponding inclined surfaces of the rail and post having the inner longitudinal edges thereof in a common plane, said face and side portions having outer surfaces lying in a common plane parallel to the first plane, for equal spreading of said face and side portions by a sheet engaged thereby providing uniform gripping engagement of the sheet by the post and rail along the vertical and horizontal edges, respectively, of the sheet.

2. A rail-and-post structure as in claim 1 wherein said corresponding inclined surfaces of the locking ribs of the post and rail have outer longitudinal edges in a common plane parallel to the first plane.

3. A rail-and-post structure as in claim 1 wherein said face portions of the post, at the outer longitudinal edges of the inclined surfaces of the locking ribs thereof, include flattened edges abutting against adjacent ends of the side portions of the rail in the interlocked condition of the post and rail.

References Cited by the Examiner

UNITED STATES PATENTS

| 428,291 | 5/90 | Stuart | 189—41 |
| 559,335 | 4/96 | Kindl | 189—41 |
| 1,470,174 | 10/23 | Lachman | 189—24 |
| 1,498,124 | 6/24 | Seybolt et al. | 189—24 |
| 2,407,721 | 9/46 | Nauert | 189—36 X |
| 2,914,147 | 11/59 | Millard | 189—34 |
| 3,013,642 | 12/61 | Hammitt et al. | 189—34 |

FOREIGN PATENTS

| 297,867 | 10/28 | Great Britain. |
| 794,097 | 4/58 | Great Britain. |

RICHARD W. COOKE, JR., *Primary Examiner.*

CORNELIUS D. ANGEL, JACOB L. NACKENOFF,
*Examiners.*